United States Patent

[11] 3,602,096

[72] Inventor Alex Toth
Lincolnwood, Ill.
[21] Appl. No. 847,834
[22] Filed Aug. 6, 1969
[45] Patented Aug. 31, 1971
[73] Assignee Ellis Corporation
Chicago, Ill.

[54] PROGRAM CONTROL APPARATUS
12 Claims, 9 Drawing Figs.
[52] U.S. Cl. .................................................. 91/37,
137/624.18, 137/624.11, 235/201
[51] Int. Cl. .................................................. F15b 21/02,
G05b 19/14
[50] Field of Search .................................. 137/624.18,
624.2, 624.11; 91/36, 37; 235/201, 61.117

[56] References Cited
UNITED STATES PATENTS
3,099,995 8/1963 Raufenbarth ................. 137/82
3,198,084 8/1965 Hague ........................... 137/624.18 X
3,485,970 12/1969 Schonfeld ..................... 235/61.117X FOREIGN PATENTS
1,058,394 11/1953 France ......................... 74/209
962,663 7/1964 Great Britain ................ 235/61.117

Primary Examiner—Alan Cohan
Attorney—Mason, Kolehmainen, Rathburn & Wyss

ABSTRACT: A moving perforated chart or other record medium selectively uncovers sensing openings in the face of a sensing or reading member. A pressurized region within the sensing member communicates through passages exposed to the sensing openings with pressure-responsive devices, such as diaphragm-operated valves or switches. When a sensing opening is exposed to atmosphere by a chart perforation, the corresponding pressure-responsive device experiences a pressure reduction as pressure is released through the exposed sensing opening. The reduction of pressure is abrupt since the passage from the pressurized region is arranged to discharge directly through the opening. Because the pressure-responsive devices are normally pressurized, each may be controlled not only by the chart but also by a remote pressure-releasing valve located at any desired point in the conduit leading to the device.

INVENTOR:
ALEX TOTH

ATTORNEYS

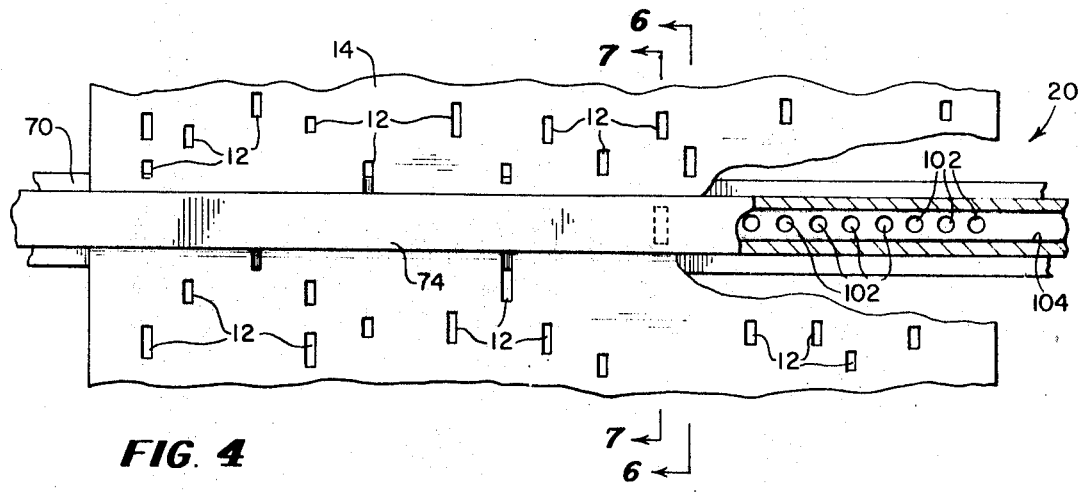
FIG. 4
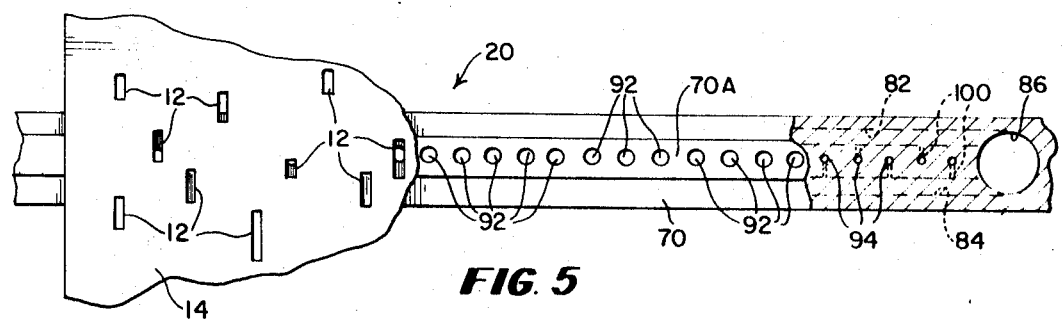
FIG. 5
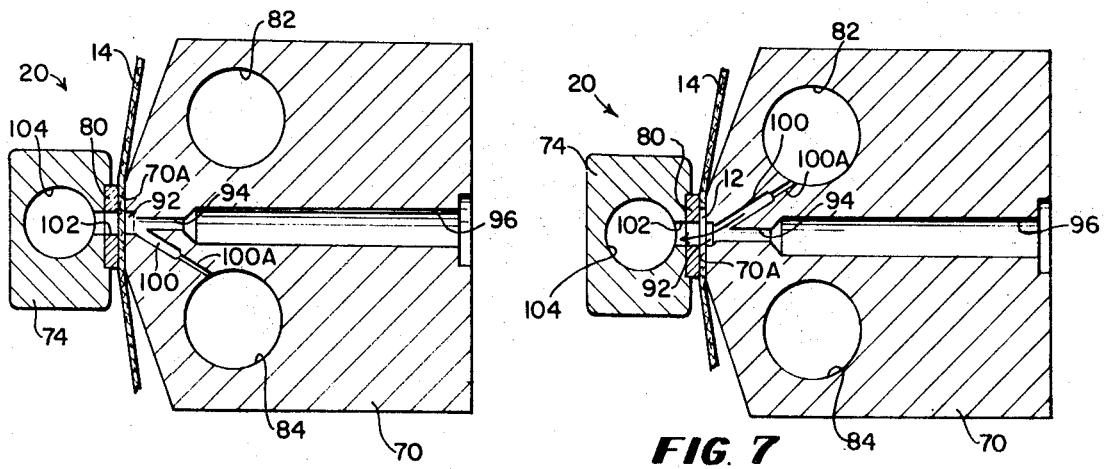
FIG. 6
FIG. 7
INVENTOR:
ALEX TOTH
BY Mason, Kolehmainen,
Rathburn & Wyss
ATTORNEYS

INVENTOR:
ALEX TOTH

PROGRAM CONTROL APPARATUS

The present invention relates to program control apparatus, and more particularly to improvements in pneumatic or other fluid-pressure-operated apparatus for carrying out a predetermined sequence of operations under the control of a perforated chart or other record medium.

Many types of pressure or vacuum-operated units for selectively controlling pressure-responsive devices in accordance with perforations in a moving chart or record have been used. In U.S. Pat. No. 2,678,063, issued to Hubert C. Ellis and assigned to the owner of the present application, there is disclosed and claimed a program control apparatus wherein an elongated perforated sheet or chart is moved across the face of a tracker bar having a series of sensing openings. The tracker bar is mounted within a sealed, pressurized housing. When a perforation overlies a sensing opening pressure is admitted through the tracker bar to operate a pressure-responsive device such as a diaphragm-operated valve or switch. A bleed opening associated with the diaphragm-operated device serves to release the pressure when the chart once more covers the sensing opening, thereby to return the device to its initial condition. Manual operation of the device is achieved, in the absence of a chart perforation, by moving the diaphragm-operated device with a manual operator mounted on the diaphragm unit.

Although the program control apparatus disclosed in the above-identified patent has been highly successful for its intended uses, nevertheless that apparatus is subject to certain disadvantages. One of the disadvantages is that the pressurized housing of the unit is expensive to manufacture and troublesome to operate. Further, the use of a pressurized atmosphere gives rise to problems of humidity, dust and the like. The fact that pressurized air is admitted through the tracker bar and is released from a bleed opening gives rise to difficulties caused by the admission of dust and dirt into the pneumatic system. In addition, remote manual operation of the controlled devices is difficult to achieve.

Among the important objects of the present invention are to provide an improved program control apparatus; to provide an improved apparatus of the general nature disclosed in the above-identified patent; to provide an apparatus which does not require a sealed, pressurized housing and which can be subjected directly to the atmosphere; to provide a device wherein the problems of fouling by dust and humidity are minimized; and to provide an improved program control apparatus capable of convenient remote manual control.

In brief, a program control apparatus constructed in accordance with the present invention may comprise a sensing device in the form of an elongated tracker bar having a face over which a perforated chart is moved. Openings in the face of the tracker bar are selectively uncovered by perforations in the moving chart. In accordance with the invention the tracker bar may be exposed to atmospheric pressure, and a pressurized region within the tracker bar communicates through a system of passages with a series of pressure-responsive devices. The passages include first passages extending from each device to a corresponding sensing opening in the tracker bar, and second passages leading from each first passage to the pressurized region. Normally the sensing opening is closed by an imperforate segment of the chart and the pressure-responsive device is pressurized by connection of the device through the first and second passages to the pressurized region. When a perforation uncovers the sensing opening, the device is operated by the resulting reduction in pressure.

In accordance with a feature of the invention the difference in pressure experienced by the pressure-responsive device is enhanced by a novel arrangement of passageways. More specifically, the second passage leading from the pressurized region to the first passage is disposed with respect to the first passage in such a way that it is directed toward the sensing opening. Consequently, when the opening is uncovered, pressurized air flows in an uninterrupted stream outwardly from the opening to produce a marked pressure drop in that portion of the first passage leading to the pressure-responsive device.

Another feature of the present invention resides in the provision of a novel arrangement for manually operating each pressure-responsive device from any desired remote location. Normally the tracker-bar-sensing opening associated with a given pressure-responsive device is covered by the chart, and the device is pressurized. The pressure line leading from the tracker bar to the device is provided at any desired remote location with a manually operated valve or the like for producing operation of the device even though the sensing opening remains covered. Operation of the valve serves to release pressure in the pressure line thereby to subject the pressure-responsive device to a reduction in pressure.

The invention together with its objects and advantages may best be understood from the following detailed description of one embodiment of the invention illustrated in the accompanying drawings, wherein:

FIG. 4 is a fragmentary front elevational view, partly broken away, taken from the line 4—4 of FIG. 2;

FIG. 5 is a fragmentary front elevational view, partly broken away, taken from the line 5—5 of FIG. 2;

FIG. 6 is an enlarged sectional view taken along the line 6—6 of FIG. 4;

FIG. 7 is an enlarged sectional view taken along the line 7—7 of FIG. 4;

Figure 1:
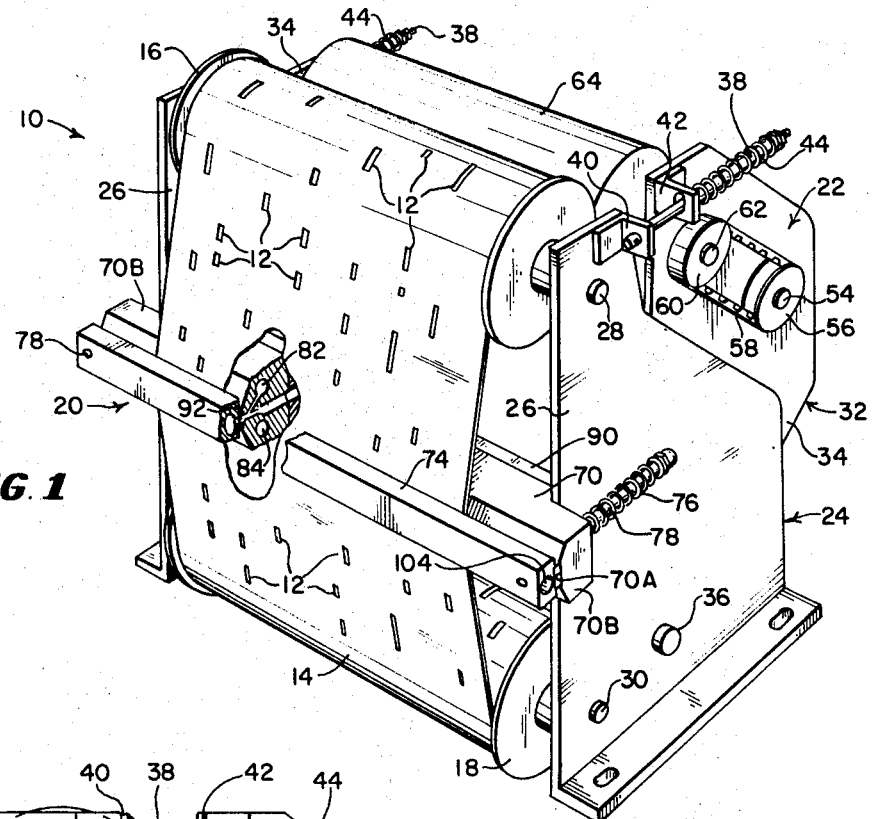
FIG. 1 is a perspective view, partly broken away, of a program control apparatus constructed in accordance with the present invention.
Figure 2:
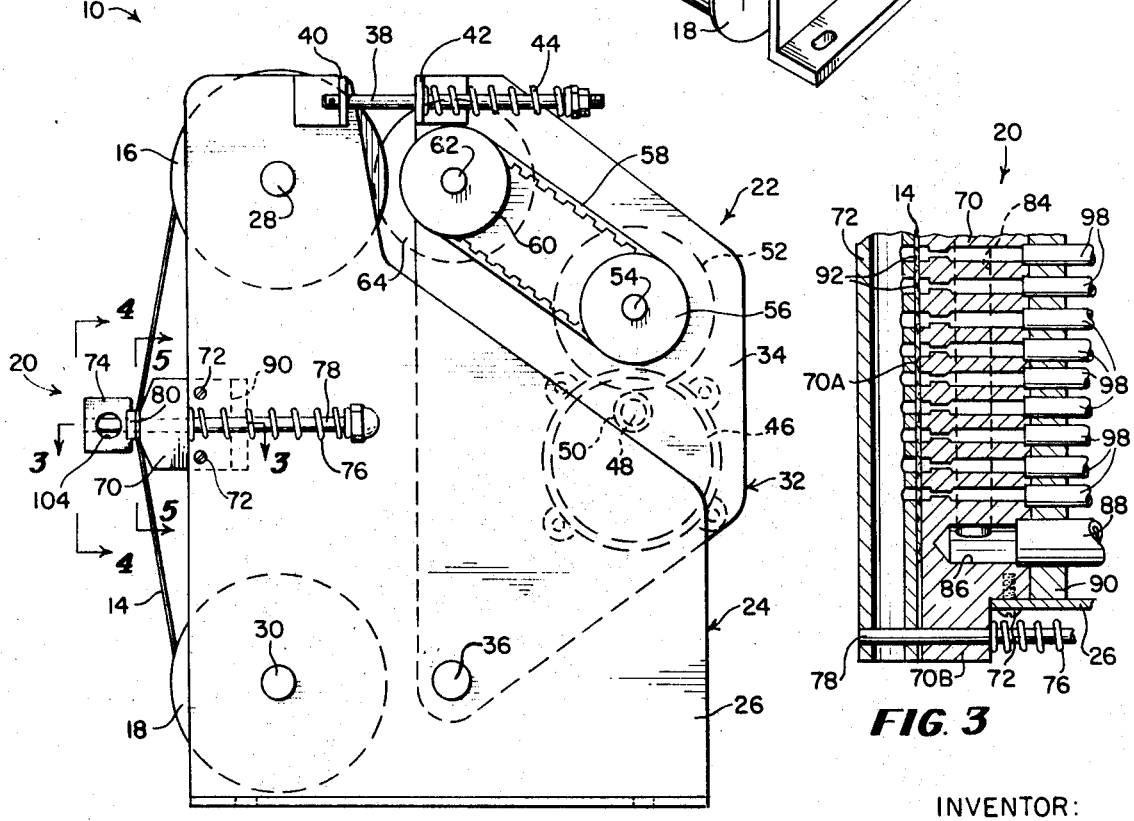
FIG. 2 is a side elevational view of the apparatus of FIG. 1.
Figure 3:
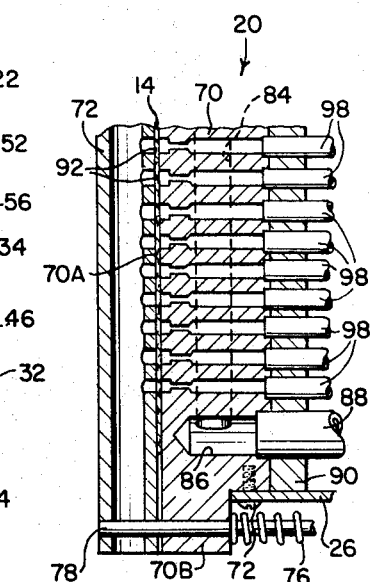
FIG. 3 is a fragmentary sectional view taken along the line 3—3 of FIG. 2.

Having reference now to the drawings, and initially to FIGS. 1 and 2, there is illustrated an improved program control apparatus constructed in accordance with the principles of the present invention and designated as a whole by the reference numeral 10. In general, the apparatus 10 serves to carry out a programmed sequence of operations in accordance with a pattern of perforations 12 in an elongated chart 14, although it should be understood that the principles of the invention are applicable to perforated records or media other than the chart 14. The chart 14 is advanced between a pair of chart support rolls 16 and 18 and past a chart-reading assembly generally designated by the reference numeral 20 by means of a chart drive system generally designated by the reference numeral 22.

Referring more specifically to the construction of the apparatus 10, the apparatus includes a main frame 24 including a pair of spaced sidewalls 26 rotatably supporting a pair of shafts 28 and 30 upon which are respectively mounted the chart support rolls 16 and 18. The chart reading assembly 20 is also supported between the sidewalls 26 in the path of movement of the chart 14 between the rolls 16 and 18. Each of the sidewalls 26 includes a mounting flange for attachment of the apparatus 10 to a suitable support or the like, and the apparatus may be enclosed within a housing of any desired construction (not shown).

Pivotally mounted upon the main frame 24 is a subframe 32 upon which are supported the components of the chart drive system 22. The subframe 32 includes a pair of spaced sidewalls 34 pivotally mounted upon a pivot shaft 36 extending between the walls 26 of the main frame 24. The subframe 32 is held captive within a limited range of movement by a pair of slide rods 38 fixed to brackets 40 attached to the sidewalls 26 and slidably extending through recesses in cooperating brackets 42 supported on the sidewalls 34 of the subframe 32. The subframe 32 is urged toward the main frame 24 by means of a pair of springs 44 surrounding the slide rod 38 and bearing against the brackets 42.

Details of the chart drive system 22 are incidental to an understanding of the present invention, and for purposes of clarity the drive system is disclosed in a somewhat simplified fashion. A main drive motor 46 (FIG. 2) is mounted between the walls 34 of the subframe 32 and includes a drive shaft 48 supporting a drive pinion 50. A drive gear 52 engageable by the pinion 50 is supported on a shaft 54 extending through the wall 34 and supporting a pulley 56. A toothed belt 58 trained around the pulley 56 and around an additional pulley 60 serves to impart rotation to shaft 62 extending between the sidewalls 34 and supporting an elongated drive roll 64.

In order to apply an even and uniform driving force to the chart 14, the drive roll 64 preferably includes a soft resilient outer surface engageable with the surface of the chart 14 as it is wrapped around the roll 16. For example, the roll 38 may include a rubber or other elastomeric outer layer. To further ensure even application of driving force to the chart 14, the pivotally mounted subframe 32 is biased at both sides toward the main frame 24 by the springs 44 and is able to accommodate uneven wear of parts or uneven thickness in the chart 14 or the like. The arrangement of drive pulleys 56 and 60 and drive belt 58 may be duplicated on the opposite side of the subframe.

In order to commence a program control operation using the apparatus 10, the chart 14 is initially mounted on the roll 18, and the leading edge of the chart is advanced through the chart reading assembly 20 and started onto the roll 16. The subframe 32 and drive roll 64 can be pulled back to provide clearance during mounting of the chart. The motor is energized and the chart drive roll 64 is rotated by the drive pulleys 56 and 60 and the toothed belt 58. Consequently, the chart 14 is pulled through the chart-reading assembly 20 and is wound onto the roll 16. When the operation is completed, the chart 14 may be rewound onto the roll 18 by suitable drive means or the like (not shown).

In accordance with an important feature of the present invention, it is not necessary for the program control apparatus 10 to be mounted within a pressurized atmosphere. Consequently, the necessity for provision of an expensive pressurized housing or the like is avoided. Rather than admitting pressure to portions of a pressure-operated system from the surrounding atmosphere, the perforations 12 in the chart 14 serve instead to release or vent pressure, thereby to produce operation of pressure-responsive devices controlled by the apparatus 10.

More specifically, and having reference now to the construction of the chart-reading assembly 20 best shown in FIGS. 3-7, there is provided a novel sensing device in the form of a tracker bar or body 70 having a sensing surface or face 70A traversed by the chart 14. The tracker bar 70 is supported between the sidewalls 26 of the main frame 24 by means of fastener 72 (FIGS. 2 and 3), and a pressure bar 74 is biased by a pair of springs 76 toward the tracker bar 70 to hold the chart 14 in intimate contact with the sensing surface 70A of the tracker bar 70. The springs 76 are mounted around a pair of slide rods 78 fastened to the ends of the pressure bar 74 and slidably received in openings in outwardly projecting end portions 70B of the tracker bar 70, thereby to permit the bar 74 to be pulled away from the tracker bar 70 when loading a chart 14 into the apparatus 10. In order to reduce friction between the pressure bar 74 and the moving chart 14, the inner face of the pressure bar 74 is provided with a low friction insert 80 which may, for example, be formed of plastic or the like.

As indicated above, as the chart 14 moves past the chart-reading assembly 20, the perforations 12 serve to release pressure within a series of pneumatic or other pressure-operated circuits thereby to control a plurality of pressure-responsive devices or the like. Having reference now more specifically to FIGS. 3-7, the internal configuration of the tracker bar 70 is illustrated in detail. The tracker bar 70 is provided with a pressurized region in the form of a pair of elongated chambers or cavities 82 and 84 extending substantially throughout the length of the tracker bar 70. The ends of the chambers 82 and 84 are closed so that the chambers are isolated from the surrounding atmosphere. Near one end of the tracker bar 70 a transversely extending pressure passage 86 intersects both of the cavities 82 and 84. The pressure passage 86 is adapted to be connected to suitable pressure source, such as a source of air pressure, by means of a pressure conduit 88 (FIG. 3) supported in communication with the pressure passage 86 by means of a backplate 90 fastened to the rear surface of the tracker bar 70. During operation of the program control apparatus 10 the passages or pressure chambers 82 and 84 are adapted continually to be maintained at a predetermined pressure level greater than the ambient pressure to which the tracker bar 70 is exposed.

In order independently to control a number of pressure-responsive devices in accordance with the configuration of perforations in the chart 14, the sensing surface 70A of the tracker bar 70 includes a series of sensing openings 92 each aligned in registration with a perforation-containing row of the chart 14. Each sensing opening 92 is communicated by way of a first passageway 94 with a region or cavity or enlarged passageway segment 96 in the tracker bar 70. Furthermore, each cavity 96 communicates by way of a conduit 98 (FIG. 3) with a pressure-responsive device or the like to be controlled by the apparatus 10.

Ordinarily each sensing opening 92 is covered by an imperforate segment of the chart 14 and each corresponding region or cavity 96 is normally pressurized by virtue of a second passageway 100 extending between one of the pressure chambers or cavities 82 and 84 and the corresponding first passageway 94. In order to provide a sufficient volume for the pressurized region of the tracker bar and to simplify the machining operations involved, alternate ones of the passages 100 extend upwardly to the chamber 82 and downwardly to the chamber 84.

When a perforation 12 of the chart 14 moves into registry with a sensing opening 92, a reduction in pressure is experienced by the region or cavity 96 and by the pressure-responsive device connected thereto. More specifically, when a perforation 12 overlies the sensing opening 92 (FIG. 7) the corresponding cavity 96 is vented to atmosphere through the perforation 12 and through a passage 102 extending through the pressure bar 74 and the insert 80. Passage 102 is vented to the surrounding atmosphere in any suitable manner as by means of a large-area transverse vent passage 104 extending throughout the length of the pressure bar 74.

Importantly, since the chamber 96 and the circuit controlled thereby are normally maintained in a pressurized condition and are operated by a venting or expelling of pressure through the openings 92 in response to movement of a perforation 12 over the opening 92, it is possible for the chart reading assembly 20 and program control apparatus 10 to be located in a nonpressurized region subjected only to atmospheric pressure. Consequently, the necessity for an expensive pressurized housing is avoided. In addition, since the apparatus 10 is not subjected to a superatmospheric pressure, the problems of fouling of the apparatus by dust or humidity are greatly reduced. Since the flow of pressurized air or other fluid material is out of the sensing openings 92 rather than into the sensing openings, the problem of dirt entering the system through the tracker bar is also avoided. A further advantage is that the application of pressure to the underside of the chart 14 provides a bearing effect and reduces frictional drag of the chart against the tracker bar 70.

One important aspect of the present invention resides in the configuration of the passages 100 and 94, which passages are arranged in a novel fashion to accentuate the pressure differential resulting when a perforation moves over one of the sensing openings 92. More specifically, the reduction in pressure to which the cavity 96 is subjected upon opening of a sensing opening 92 by a perforation 12 is rendered abrupt by virtue of the fact that the passage 100 is angularly disposed with respect to the passage 94 and is directed outwardly of the opening 92. When the opening 92 is uncovered, a flow of pressurized fluid takes place from the passage 100 directly out of the opening 92 without interference. This flow is indicated by the arrow in FIG. 7. A jetlike effect is produced which is believed to result in entrainment of air from the passage 94 in the jetstream, thus reducing the pressure in the region 96. A flow restriction 100A in the passage 100 provides the controlling restriction in the path of flow through the opening 92, and as a result the largest pressure drop in the airflow exists across the restriction 100A. Consequently, the cavity 96 is maintained at a relatively low pressure when the sensing opening 92 is not blocked.

Figure 8:
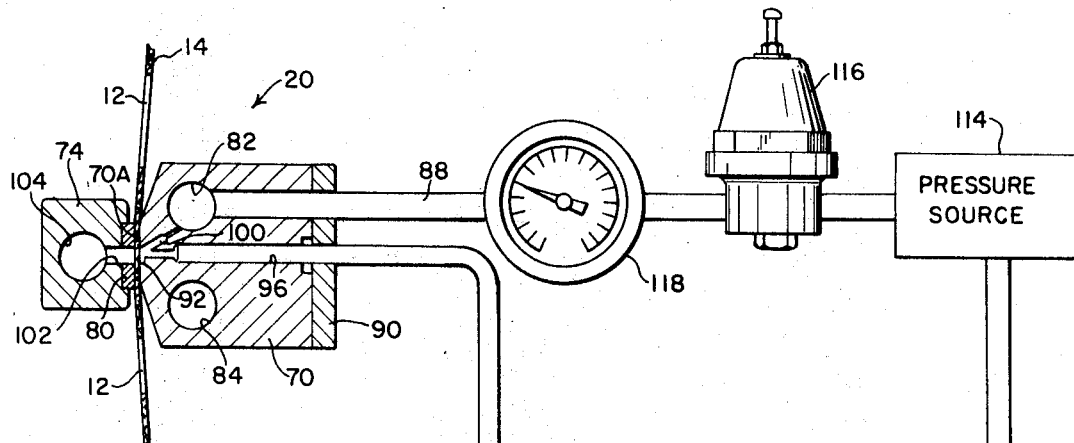
FIG. 8 is a diagrammatic view, including portions shown in section, of one circuit controlled by the apparatus of FIG. 1.

In FIG. 8 there is illustrated in somewhat diagrammatic and schematic form a portion of the pneumatic system controlled by the chart-reading assembly 20 of the present invention. More specifically, there is illustrated a pneumatic or fluid-pressure-operated circuit designated as a whole by the reference numeral 108 and associated with a single one of the sensing openings 92. It should be understood that identical or similar circuits may be associated with each of the series of sensing openings 92.

In accordance with an important feature of the present invention, the circuit 108 is capable conveniently and effectively of being controlled not only by the chart perforations 12 but also remotely from any desired location. The circuit 108 includes a pressure-responsive device generally designated by the reference numeral 110 capable of being controlled by the chart-reading assembly 20 through the agency of the circuit 108. The circuit 108 further includes a manually operated remotely located control generally designated as 112 also capable of controlling the pressure-responsive device 110. The manual control 112 can conveniently be disposed at any desired location since, except for conduit connections, it is physically independent of the pressure-responsive device 110 and of the chart-reading assembly 20.

As indicated above, the pressure chambers or cavities 82 and 84 of the tracker bar 70 are continually maintained pressurized. In connection with the circuit 108 there is illustrated a pressure source shown in block form which may comprise any suitable pressurizing apparatus such as an air compressor or the like. The pressure source 114 is connected to the chambers 82 and 84 by means of the conduit 88. A pressure regulator 116 is included in the pressure line for maintaining the operating pressure constant at any desired level as indicated by a pressure gauge 118.

Circuit 108 is illustrated in its normal condition wherein an imperforate portion of the chart 14 overlies the sensing opening 92 to prevent venting of pressure therethrough. In this condition, the pressure-responsive device 110 is pressurized and maintained in one of its two operating conditions. More specifically, the pressure-responsive device 110 is pressurized by means of the conduit 98 by way of the manual control 112 so that pressure reflected to the chamber 96 by way of the passageways 100 and 94 is applied to the device 110. Although the pressure-responsive device 110 may take other forms, in the illustrated arrangement the device 110 includes a diaphragm actuator 120 connected in controlling relation to a valve 122. The valve 122 is connected to control the application of pressure through a pressure line 124 from the pressure source 114 to any desired pressure operated device 126, illustrated for convenience in block form.

Normally, the diaphragm actuator 120 maintains the valve 122 in a position for blocking communication between the pressure source 114 and the pressure-operated device 126. The diaphragm actuator 120 may be of any desired construction and includes a flexible diaphragm 128 held between a flanged housing 130 and a suitable pressure member 132. A backup plate 134 for the diaphragm 128 is connected to a stem 136 operating a valve member 138 alternatively engageable with spaced valve seats 140 and 142 associated with valve housing 144. In the absence of an external force applied by the diaphragm actuator 120, spring 146 maintains the valve member 138 in sealing engagement against the seat 140, thereby opening the seat 142 and permitting communication through the pressure line 124 between the pressure source 114 and the pressure-operated device 126. However, in the normal condition of the circuit 108 the diaphragm operator 120 is pressurized and holds the valve member 138 against the force of the spring 146 into sealing relation against the valve seat 142 in order to block flow from the pressure source 114 and to maintain the pressure-operated device 126 in its nonoperated condition.

At predetermined intervals determined by the configuration of the moving chart 14, a perforation 12 uncovers the sensing opening 92 in the tracker bar 70. As a result, and as explained in greater detail above, pressure within the cavity 96 abruptly drops. This drop in pressure is reflected through the conduit 98 and the manual control 112 to the diaphragm actuator 120 and the spring 146 moves the valve member 138 away from the seat 142 and against the seat 140. As a result, communication to atmosphere through a vent passage 150 in the valve housing 144 is prevented, and simultaneously communication is established from the pressure source 114 for operation of the pressure-operated device 126.

When the sensing opening 92 is again blocked by an imperforate portion of the chart 14, the pressure operated device 126 returns to its nonoperated condition. More specifically, pressure is once again established within the diaphragm chamber and the valve member 138 is returned to its initial position against the seat 142 preventing the application of pressure from the pressure source 114. Simultaneously, the vent passage 150 is placed into communication with the pressure-operated device 126 to return it to its initial nonpressurized condition.

In accordance with an important feature of the invention, the pressure-responsive device 110 can be operated not only under the control of the chart-reading assembly 20, but also under the control of the remote manual control device 112. The manual control device 112 may be located at any convenient and accessible point remote from both the pressure-responsive device 110 and from the chart-reading assembly 20.

Since the pressure-operated device 110 is normally maintained in a pressurized condition due to the absence of a perforation 12 overlying the sensing opening 92, in order to produce manual operation of the pressure-responsive device 110 it is necessary merely to release the pressure at any desired point in the conduit 98. The manual control 112 may be of any desired construction, and as illustrated includes a valve 152 controlled by a manual operator 154. The manual operator 154 is connected by means of a stem 156 to a valve member 160 normally maintained in sealing engagement against a valve seat 162 of housing 164 by means of a spring 166. In this condition, communication is established through a second valve seat 168 and through conduit 98 between the chamber 96 of the tracker bar 70 and the pressure-responsive device 110. Consequently, in this position the manual control 112 has no effect upon the operation of the circuit.

When it is desired to produce operation of the pressure-responsive device 110 in the absence of a chart perforation, as for example when an operation is to be carried out manually, the manual operator 154 is depressed to move the valve member 160 into sealing engagement with the valve seat 168. Consequently, communication between the chamber 96 and the pressure-responsive device 110 is discontinued, and the diaphragm actuator 120 is vented to atmosphere through a vent passage 170 defined in the housing 164 of the valve 152. The valve seat 142 of valve 122 is opened and the pressure-operated device 126 is pressurized from the pressure source 114 throughout the period of time that the manual operator 154 is depressed.

Figure 9:
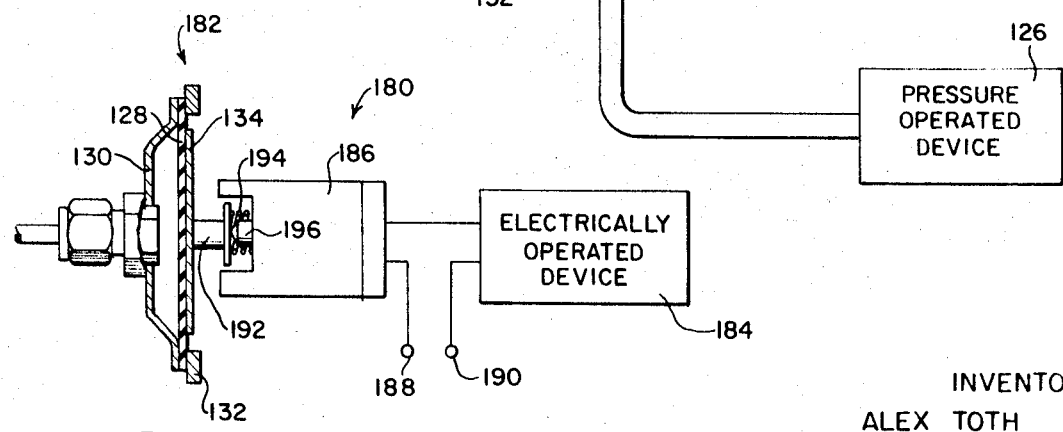
FIG. 9 is a fragmentary sectional view of one portion of another circuit controlled by the system of FIG. 1.

It should be understood that the circuit 108 illustrated in FIG. 8 comprises only one of the series of independent circuits associated with the series of sensing openings 92. Each sensing opening 92 may be provided with an identical or a similar circuit, and the circuits of each sensing opening operate independently of one another under the control of perforations 12 in the chart 14 or alternatively under the control of a series of devices such as the remote manual control 112 illustrated FIG. 8. In FIG. 9 there is illustrated an alternative pressure-operated device designated by the reference numeral 180. Each of the circuits associated with the chart-reading assembly 20 may, for example, be supplied with either one of the devices 110 or with one of the devices 180.

In general, the pressure-responsive device 180 serves to perform a controlling function in an electrical circuit rather than performing a controlling function in a fluid pressure circuit as is the case with the device 110. The device 180 includes a diaphragm actuator 182 which may be identical with the actuator 120 described above. Consequently, the actuator 182 is not described in detail, detail, and identical reference numerals are used to designate identical structural elements of the diaphragm actuators 120 and 182.

In order to control an electrically operated device generally designated by the reference numeral 184, an electrical switch 186 is connected in circuit between the device 184 and a pair of power supply terminals 188 and 190. When the chamber 148 is pressurized by the application of pressurized fluid through the conduit 98, the switch 186 is held in its open circuit condition by means of a switch-operating stem 192 supported on the diaphragm backup plate 134 and overcoming the force of a spring 194 to depress a switch-operating button 196. At such time as pressure behind the diaphragm 128 is released either by the chart-reading assembly 20 or by the manual control 112, the spring 190 moves the diaphragm 128 to its illustrated position wherein the switch-operating button 192 is released and the switch 186 is moved to its closed circuit condition. In this closed circuit condition the switch 186 completes a circuit for operation of the electrically operated device 184.

What is claimed and desired to be secured by Letters Patent of the United States is:

1. Apparatus for carrying out a program in accordance with a pattern of perforations in a moving chart, said apparatus comprising:
    an elongated member having a sensing surface adapted to be engaged by the moving chart;
    a series of openings in said sensing surface disposed along a line transverse to the direction of movement of the chart and adapted to register with perforation containing regions of the chart;
    a system of passages defined within said member and including a series of first passages extending from said sensing openings and through said member for normally intercommunicating each said sensing opening with a pressure-responsive device, said first passages lying substantially in a plane extending through said body and intersecting said sensing surface along said line;
    a pair of elongated pressure cavities in said member adapted to be coupled to a source of pressurized fluid, said pair of cavities each being disposed generally parallel to said line and on opposite sides of said plane;
    and a plurality of second passages in said member extending from alternate ones of said first passages to alternate ones of said pressure cavities for pressuring said first passages and thereby applying pressure to said devices in response to blocking of said sensing openings by imperforate segments of said chart.

2. The apparatus of claim 1, each of said second passages intersecting said corresponding first passage at an acute angle and the axes of both said passages extending through said corresponding sensing opening.

3. The apparatus of claim 1, said second passages including relatively restricted portions for limiting the rate of flow of pressurized air into said first passages in response to opening of said sensing openings by perforations in said chart.

4. Program control apparatus for use with an elongated perforated chart, said apparatus comprising: a main frame; a chart-reading assembly mounted on the main frame; a pair of chart support rolls rotatably mounted on the main frame; a subframe mounted for pivotal movement on the main frame; a chart drive roll mounted on said subframe and engageable with the chart on one of said chart support rolls for pulling the chart form the other of said chart support rolls and through said chart-reading assembly; and drive means including a drive motor drivingly coupled to said chart drive roll; said drive means being supported on said subframe.

5. The program control apparatus of claim 4, said chart drive roll having an outer layer of elastomeric material.

6. The program control apparatus of claim 5, spring means for biasing said chart drive roll toward said one chart support roll.

7. The program support apparatus of claim 6, said subframe including spaced sidewalls, said chart drive roll being mounted between said sidewalls, and said spring means comprising first and second springs each independently biasing each said sidewall.

8. Program control apparatus adapted to be used with a perforated record medium and comprising a sensing means having a series of openings adapted selectively to be opened by record medium perforations at predetermined intervals, and a plurality of independent pressure-operated circuits, each of said circuits including:
    a pressure-responsive device;
    a first conduit extending from said device to one of said openings;
    a source of pressurized fluid;
    a second conduit coupling said source of pressurized fluid to said first conduit immediately adjacent said one opening for normally pressurizing said pressure-responsive device;
    the opening of said one opening by a record medium perforation serving to vent said first conduit and to depressurize said pressure-responsive device;
    a flow restriction in said second conduit for preventing rapid depletion of pressure upon venting of said first conduit;
    control means coupled to said pressure-responsive device and operable between first and second conditions in response to pressurization and depressurization of said pressure-responsive device; and
    valve means connected in said first conduit between the intersection of said first and second conduits and said pressure-responsive device for selectively venting said first conduit and depressurizing said pressure-responsive device in the absence of a record medium perforation.

9. The program control apparatus of claim 8, said valve means being manually operated.

10. The program control apparatus of claim 8, said pressure-responsive device comprising a diaphragm actuator.

11. The program control apparatus of claim 10, said control means comprising a valve.

12. The program control apparatus of claim 10, said control means comprising a switch.